(12) United States Patent
Lim et al.

(10) Patent No.: US 10,454,808 B2
(45) Date of Patent: Oct. 22, 2019

(54) MANAGING PHYSICAL NETWORK CROSS-CONNECTS IN A DATACENTER

(71) Applicant: HONG KONG TELECOMMUNICATIONS (HKT) LIMITED, Hong Kong (HK)

(72) Inventors: Lawrence Lim, Sunnybank (AU); Yan Shen, Rochedale South (AU)

(73) Assignee: Hong Kong Telecommunications (HTK) Limited (HK)

( * ) Notice: Subject to any disclaimer, the term of this patent is extended or adjusted under 35 U.S.C. 154(b) by 0 days.

(21) Appl. No.: 15/473,249

(22) Filed: Mar. 29, 2017

(65) Prior Publication Data

US 2017/0289015 A1    Oct. 5, 2017

Related U.S. Application Data

(60) Provisional application No. 62/314,647, filed on Mar. 29, 2016.

(51) Int. Cl.
*H04L 12/751* (2013.01)
*G06F 16/28* (2019.01)
(Continued)

(52) U.S. Cl.
CPC ............ *H04L 45/02* (2013.01); *G06F 16/284* (2019.01); *G06N 5/04* (2013.01); *H04L 49/25* (2013.01); *H04Q 3/665* (2013.01); *H04L 45/70* (2013.01); *H04L 49/15* (2013.01); *H04L 49/40* (2013.01); *H04Q 2213/13076* (2013.01)

(58) Field of Classification Search
CPC ......... H04L 45/02; H04L 49/25; H04L 45/70; H04L 49/15; H04L 49/40; G06N 5/04; G06F 17/30595; H04Q 3/665

See application file for complete search history.

(56) References Cited

U.S. PATENT DOCUMENTS

2005/0172018 A1    8/2005  Devine et al.
2006/0271341 A1   11/2006  Brown et al.
(Continued)

FOREIGN PATENT DOCUMENTS

WO       20120047757 A1    4/2012

OTHER PUBLICATIONS

International Search Report dated Aug. 11, 2017 for PCT Application No. PCT/US17/24812.
(Continued)

*Primary Examiner* — Feben Haile
(74) *Attorney, Agent, or Firm* — EIP US LLP

(57) ABSTRACT

A datacenter is represented by a datacenter model including instances of data object instances that represent ports of endpoints, intermediate ports of network components, and cross-connects between ports. In response to receiving specification of a source and destination endpoint, a computer system identifies a path through the data center according to the datacenter model. The path may be identified from among a plurality of candidate paths through the datacenter according to one or more criteria such as speed, capacity, quality, and path length. The path may be output to an operator for implementation and may then be tested. Cross-connects added according to the path may then be added to the datacenter model.

16 Claims, 11 Drawing Sheets

(51) Int. Cl.
*G06N 5/04* (2006.01)
*H04L 12/947* (2013.01)
*H04Q 3/66* (2006.01)
*H04L 12/721* (2013.01)
*H04L 12/933* (2013.01)
*H04L 12/931* (2013.01)

(56) References Cited

U.S. PATENT DOCUMENTS

| | | |
|---|---|---|
| 2010/0008482 A1 | 1/2010 | Tucker |
| 2012/0117231 A1* | 5/2012 | Ingle .................... G06Q 10/00 709/224 |
| 2013/0246673 A1 | 9/2013 | Cox |
| 2014/0192812 A1 | 7/2014 | Berman |
| 2014/0280961 A1 | 9/2014 | Martinez et al. |
| 2014/0310411 A1* | 10/2014 | Westerfeld ................ G06F 8/71 709/224 |
| 2015/0207695 A1 | 7/2015 | Varney et al. |
| 2015/0381515 A1 | 12/2015 | Mattson et al. |
| 2016/0091685 A1* | 3/2016 | Raza .................... G02B 6/4452 398/19 |
| 2016/0142291 A1* | 5/2016 | Polland ................... H04L 45/36 370/392 |

OTHER PUBLICATIONS

European Extended Search report dated Jan. 29, 2019 for EP Application 17776576.5.

\* cited by examiner

450 →

Table 1: tbl_Status

| Field | Data Type | Description | Key Type | Example |
|---|---|---|---|---|
| 502- stat_id | INT | Unique identifier for status entries | Primary | 1 |
| 504- status | VARCHAR(50) | Status description | | Running |
| 506- note | TEXT | Field to put extra info. | | Running properly |

Table 2: tbl_CableType

| Field | Data Type | Description | Key Type | Example |
|---|---|---|---|---|
| 602- cType_id | INT | Unique identifier for cable type entries | Primary | 1 |
| 604- cType | VARCHAR(50) | cable type description | | Fiber - Single Mode |
| 606- note | TEXT | Field to put extra info. | | speed: 10g |

Table 3: tbl_NodeType

| Field | Data Type | Description | Key Type | Example |
|---|---|---|---|---|
| 702- nType_id | INT | Unique identifier for type of node entries | Primary | 1 |
| 704- nType | VARCHAR(50) | Node description | | Rack |
| 706- note | TEXT | Field to put extra info. | | Customer Rack |

FIG. 7

Table 4: tbl_Node

| | Field | Data Type | Description | Key Type | Example |
|---|---|---|---|---|---|
| 802- | node_id | INT | Unique identifier for nodes in a connection | Primary | 1 |
| 804- | conn_id | INT | Refer to tbl_Connection, the connection has the node | Foreign | 4 |
| 806- | name | VARCHAR(50) | Name of the node | | DC1.1C.01.01.P45.2 |
| 808- | node_type | INT | Refer to tbl_NodeType, type of the entity | | 1 |
| 810- | cType_id | INT | Refer to tbl_CableType, type of the cable | | 1 |
| 812- | path_sequence | INT | Indicate the order of node in the connection | | 1 |
| 814- | note | TEXT | Field to put extra info | | Added 21 Jan 2016 |

FIG. 8

Table 5: tbl_EndPoint

| | Field | Data Type | Description | Key Type | Example |
|---|---|---|---|---|---|
| 902- | end_id | INT | Unique identifier for endpoint nodes in a connection | Primary | 4 |
| 904- | name | VARCHAR(50) | Name of the end node | | DC1.1C.01.01.P45.1 |
| 906- | node_type | INT | Refer to tbl_NodeType, type of the end node | | 3 |
| 908- | cType_id | INT | Refer to tbl_CableType, type of the cable | | 1 |
| 910- | note | TEXT | Field to put extra info | | Connect to itself |

FIG. 9

Table 6: tbl_Version

| | Field | Data Type | Description | Key Type | Example |
|---|---|---|---|---|---|
| 1002- | ver_id | INT | Unique identifier for the version | Primary | 2 |
| 1004- | version | VARCHAR(50) | Name of the release version | | 1.1 |
| 1006- | change | TEXT | Record the changes in the version | | * Add a version control table |
| 1008- | update_time | DATETIME | Refer to tbl_CableType, type of the cable | | 2016-01-28 17:30:20 |

FIG. 10

Table 7: tbl_Connection (Fact)

| | Field | Data Type | Description | Key Type | Example |
|---|---|---|---|---|---|
| 1102- | conn_id | INT | Unique identifier for the connection | Primary | 10 |
| 1104- | order_id | VARCHAR(50) | Refer to order collection, get the order id | Foreign | ObjectId("5677e6..."). |
| 1106- | tech_id | VARCHAR(50) | Refer to user collection, get the technician user id | Foreign | ObjectId("5677e6..."). |
| 1108- | pm_id | VARCHAR(50) | Refer to user collection, get the pm user id | Foreign | ObjectId("5677e6..."). |
| 1110- | status_id | INT | Refer to tbl_Status, indicate the current status | Foreign | 1 |
| 1112- | active | BOOLEAN | Show if the connection is active | | TRUE |
| 1114- | active_date | DATETIME | Show the time of activation | | 2015-11-30 00:00:00 |
| 1116- | deactive_date | DATETIME | Show the time of deactivation if inactive | | |
| 1118- | source_customer_id | VARCHAR(50) | Refer to user collection, get the source customer id | Foreign | ObjectId("5677e6..."). |
| 1120- | dest_customer_id | VARCHAR(50) | Refer to user collection, get the terminated customer id | Foreign | ObjectId("5677e6..."). |
| 1122- | source_node_id | INT | Refer to tbl_EndPoint, get the id of source node | Foreign | 14 |
| 1124- | dest_node_id | INT | Refer to tbl_EndPoint, get the id of destination node | Foreign | 20 |
| 1126- | tested | BOOLEAN | Record if the connection is tested | | TRUE |
| 1128- | test_date | DATETIME | Show the testing date | | 2015-11-25 17:30:00 |
| 1130- | path_length | FLOAT | Record the total length of running cable | | 138.2 |
| 1132- | note | TEXT | Field to put extra info | | P2 Fiber connection |

Table 8: Xconnect document-based schema
{
1202 —— conn_id: string
1204 —— order_id: string, reference key
1206 —— tech_id: string, reference key
1208 —— pop_id: string, reference key
1210 —— status: array, e.g. ["Running", ...]
1212 —— isActive: boolean
1214 —— active_time: datetime
1216 —— inactive_time: datetime
1218 —— source_customerId: string, reference key
1220 —— dest_customerId: string, reference key
1222 —— source_node: embed document, {
    1224 —— name: string, e.g. "DC1.1C.01.01.F45.1"
    1226 —— type: array, e.g. ["Rack", ...]  ⎫ 302
    1228 —— cableType: array, e.g. ["Fiber", ...]
    1230 —— note: string
    }
1232 —— dest_node: embed document, {
    1234 —— name: string, e.g. "DC1.3C.02.03.F45.2"
    1236 —— type: array, e.g. ["Cabinet", ...]  ⎫ 302
    1238 —— cableType: array, e.g. ["Fiber", ...]
    1240 —— note: string
    }
1242 —— path: array of embed documents, [
    1244 —— { sequence: number, e.g. 1
    1246 —— name: string, "C3.B.01.02.F"
    1248 —— type: array, e.g. ["Connector", ...]  ⎫ 304
    1250 —— cableType: array, e.g. ["Fiber", ...]
    1252 —— note: string },
    1254 —— { sequence: number, e.g. 2
    1256 —— name: string, "C1.C.01.02.F"
    1258 —— type: array, e.g. ["Connector", ...]  ⎫ 304
    1260 —— cableType: array, e.g. ["Fiber", ...]
    1262 —— note: string }
    ...
1264 —— path_length: number, total running cable length
1266 —— note: string, field to put extra info
}

MANAGING PHYSICAL NETWORK CROSS-CONNECTS IN A DATACENTER

RELATED APPLICATIONS

This application claims the benefit of U.S. Provisional Ser. No. 62/314,647, filed Mar. 29, 2016, and entitled MANAGING PHYSICAL NETWORK CROSS-CONNECTS IN A DATACENTER, which is hereby incorporated herein by reference in its entirety.

BACKGROUND

Field of the Invention

The present disclosure relates to datacenters, and more particularly to managing physical network cross-connects in a datacenter.

Background of the Invention

A datacenter is a physical facility that houses computer systems (typically servers) and associated components including data storage and telecommunications equipment. Customers of a datacenter would have their computer systems, such as those which host a company's web site, located in the datacenter, which would provide electrical power and connections to telecommunications resources used by the customer's computers, and may also provide connections to other computer systems within the datacenter. The computer systems hosted in datacenters are often housed in vertically arranged banks supported by a rack; the term "rack" is therefore used to refer to a single vertical bank of computers and related components in a datacenter.

A myriad of physical connections between various systems are required; these physical connections are referred to as physical network cross-connects, or more colloquially as just "cross-connects". Cross-connects are dedicated physical network connections (typically by way of copper or fiber cabling) between two network endpoint ports located in a datacenter, and may traverse a plurality of network intermediate ports between the network end point ports and may comprise multiple individual cables. As used herein, the term "port" means a physical port on a computer system or part thereof, such as a server, a router, a patch panel, or on a connector, to which a cable may be connected to enable wired transmission of data. The transmitted data may be electrical or optical data. Broadly speaking, there are two main types of cable media which may be used to implement cross-connects: fiber connection, such as single mode fiber (SMF) or dual mode fiber (DMF or "duplex mode"), and copper connection (CAT), such as CAT3, CAT5 or CAT6. While shorter "patch" cabling (typically three feet or less) may hang freely, longer lengths of cables or bundled cabling are often supported in open-topped U-shaped conduits following predefined paths in the datacenter. A "connector" aggregates a plurality of cables, each having its own dedicated port on the connector, into structured cabling (an "interconnector" or IC) which may be further bundled into backbone or "trunk" cabling (which may extend vertically between floors of a datacenter). Trunk cabling is in turn coupled to a "cabinet". A "cabinet" is a specialized mass interconnect system that is co-located with the telecommunications equipment that enables connection to external networks such as the Internet; typically this equipment, along with one or more cabinets, is located in an Intermediate Connection Room (ICR), also called a "Meet-Me Room" or "InterConnect Room".

Within a single datacenter site, there are two main types of "end-to-end" cross-connect: a cross-connect between a first port on a server or associated equipment (i.e. a rack) and a second port on the equipment (i.e. a rack) of a telecommunication service provider, and a cross-connect between a first port on a first server or associated equipment (i.e. a first rack) and a second port on a second server or associated equipment (i.e. a second rack). In the first type of cross-connect, one network endpoint port may be on a customer's server and the other network endpoint port may be on equipment located in the datacenter and operated by an Internet Service Provider (ISP) so as to enable the customer's server to connect to the Internet. In the second type of cross-connect, one network endpoint port may be on a first server and the other network endpoint port may be on a second server located elsewhere in the datacenter. The two servers may belong to the same legal person so that servers belonging to a single entity can cooperate even though physically separated, or to different legal persons. For example, in the latter case, a server hosting a web site may connect to an Amazon Web Services (AWS) server located elsewhere in the datacenter.

The above "end-to-end" cross-connects between network endpoint ports may consist of or comprise one or more of the following individual cabled connections:

Rack (port) to connector;
Rack (port) to cabinet;
Rack (port) to ISP rack (port);
Connector to connector;
Connector to cabinet;
$Cabinet_x$ to $cabinet_x$ (i.e. within the same cabinet); and
$Cabinet_x$ to $cabinet_y$:
   between two cabinets in the same ICR; and/or
   between two cabinets in different ICRs.

Cross-connects may in some circumstances include other types of connection as well.

A datacenter may encompass hundreds or thousands of computer systems across multiple floors, and there may be thousands of cross-connects, each of which may comprise one or more individual connections. Provisioning and management of these connections can be exceptionally challenging.

The system and method disclosed herein provides an improved approach for provisioning and managing connections in a datacenter.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 5 shows a status table for the relational database datacenter model of FIG. 4;

FIG. 6 shows a cable type table for the relational database datacenter model of FIG. 4;

FIG. 7 shows a node type table for the relational database datacenter model of FIG. 4;

FIG. 8 shows a network intermediate port table for the relational database datacenter model of FIG. 4;

FIG. 9 shows a network endpoint port table for the relational database datacenter model of FIG. 4;

FIG. 10 shows a version table for the relational database datacenter model of FIG. 4;

FIG. 11 shows a cross-connect table for the relational database datacenter model of FIG. 4;

FIG. 12 shows an exemplary document-based schema for a noSQL datacenter model in accordance with embodiments of the present invention;

DETAILED DESCRIPTION

Figure 1:
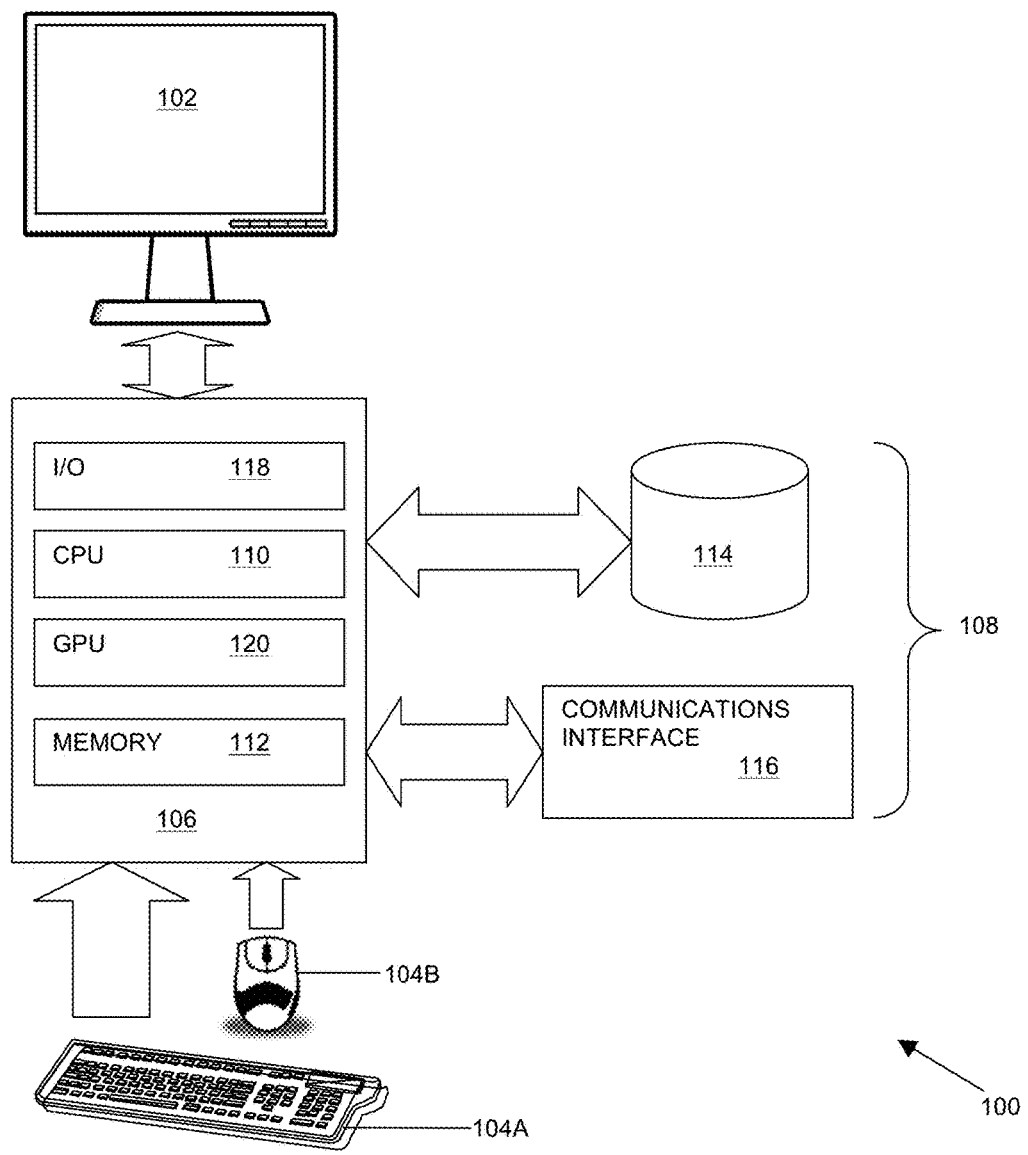
FIG. 1 is a schematic block diagram of an example computer system in respect of which aspects of the present disclosure may be implemented.

The present disclosure describes systems for managing cross-connects in a datacenter, and will be implemented as part of a computer system used in management of the datacenter.

In one aspect, the disclosure is directed to a system for managing physical network cross-connects in a datacenter. The system comprises at least one processor coupled to a memory for executing instructions and at least one tangible computer-readable medium coupled to the processor(s). The at least one tangible computer-readable medium stores a datacenter model of a datacenter. The datacenter model comprises a plurality of network port data objects, including a network endpoint port data object and a network intermediate port data object, as well as a cross-connect data object. Each network port data object has a unique port identifier attribute, a port position attribute and a communication port cable type attribute, and each cross-connect data object has a source port attribute and a destination port attribute. The datacenter model further comprises a plurality of network port instances, including a plurality of network endpoint port instances and a plurality of network intermediate port instances. Each network endpoint port instance is an instance of a network endpoint port data object and corresponds to a real-world network endpoint port in the datacenter represented by the datacenter model, and each network intermediate port instance is an instance of a network intermediate port object and corresponds to a real-world network intermediate port in the datacenter represented by the datacenter model. The datacenter model further comprises a connection map comprising a plurality of cross-connect instances. Each cross-connect instance is an instance of the cross-connect data object and corresponds to a real-world cross-connect between two real-world network endpoint ports in the datacenter represented by the datacenter model and traverses zero or more real-world network intermediate ports in the datacenter represented by the datacenter model. A network cross-connect request module executes in the at least one processor. The network cross-connect request module comprises instructions for receiving incoming requests for implementation of a physical network cross-connect from a first real-world network endpoint port to a second real-world network endpoint port, wherein both the first real-world network endpoint port and the second real-world network endpoint port are physically located in the datacenter. The network cross-connect request module communicates with a network cross-connect authorization module executing in the at least one processor. The network cross-connect authorization module comprises instructions for verifying the incoming requests and, for each request, responsive only to verifying that the request is authorized, passing the request to an optimizing module executing in the at least one processor. The optimizing module comprises instructions for, for each request, using the datacenter model to determine, according to at least one optimizing criterion, a path from the first real-world network endpoint port to the second real-world network endpoint port and traversing zero or more real-world network intermediate ports in the datacenter represented by the datacenter model.

In another aspect, the present disclosure is directed to a method for managing physical network cross-connects in a datacenter.

An illustrative computer system in respect of which the technology herein described may be implemented is presented as a block diagram in FIG. 1. The illustrative computer system is denoted generally by reference numeral 100 and includes a display 102, input devices in the form of keyboard 104A and pointing device 104B, computer 106 and external devices 108. While pointing device 104B is depicted as a mouse, it will be appreciated that other types of pointing device may also be used.

The computer 106 may contain one or more processors or microprocessors, such as a central processing unit (CPU) 110. The CPU 110 performs arithmetic calculations and control functions to execute software stored in an internal memory 112, preferably random access memory (RAM) and/or read only memory (ROM), and possibly additional memory 114. The additional memory 114 may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 114 may be physically internal to the computer 106, or external as shown in FIG. 1, or both.

The computer system 100 may also include other similar means for allowing computer programs or other instructions to be loaded. Such means can include, for example, a communications interface 116 which allows software and data to be transferred between the computer system 100 and external systems and networks. Examples of communications interface 116 can include a modem, a network interface such as an Ethernet card, a wireless communication interface, or a serial or parallel communications port. Software and data transferred via communications interface 116 are in the form of signals which can be electronic, acoustic, electromagnetic, optical or other signals capable of being received by communications interface 116. Multiple interfaces, of course, can be provided on a single computer system 100.

Input and output to and from the computer 106 is administered by the input/output (I/O) interface 118. This I/O interface 118 administers control of the display 102, keyboard 104A, external devices 108 and other such components of the computer system 100. The computer 106 also includes a graphical processing unit (GPU) 120. The latter may also be used for computational purposes as an adjunct to, or instead of, the (CPU) 110, for mathematical calculations.

The various components of the computer system 100 are coupled to one another either directly or by coupling to suitable buses.

Figure 2:
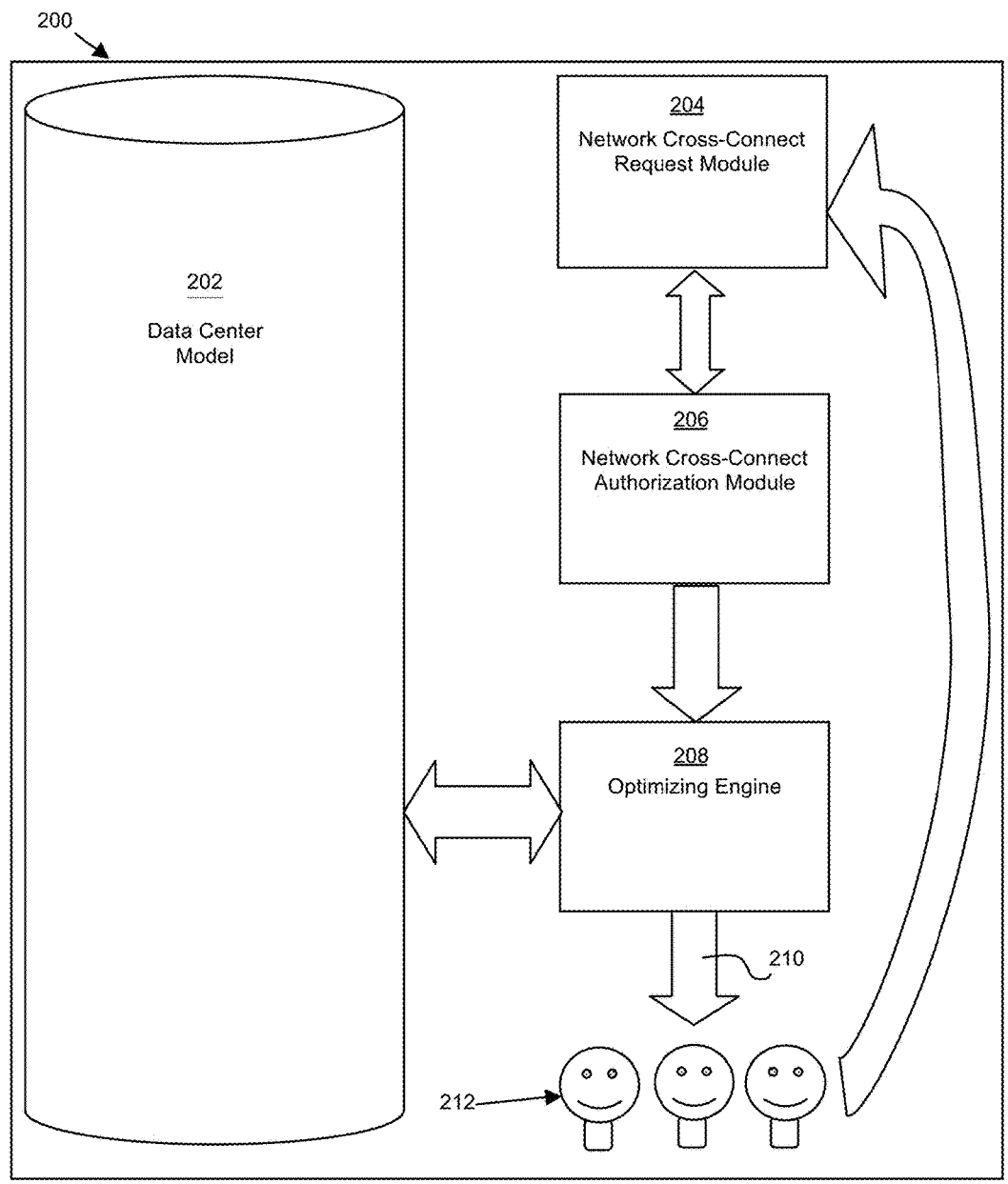
FIG. 2 is a schematic block diagram of an example system for managing cross-connects in a datacenter in accordance with embodiments of the invention.

Reference is now made to FIG. 2, which shows, in schematic form, a system 200 for managing cross-connects in a datacenter. The system 200 comprises a datacenter model 202 representing a datacenter, a network cross-connect request module 204, a network cross-connect authorization module 206, and an optimizing module 208. The datacenter model 202, network cross-connect request module 204, network cross-connect authorization module 206, and optimizing module 208 are shown schematically for simplicity of illustration. One skilled in the art will appreciate that the network cross-connect request module 204, network cross-connect authorizing module 206, and optimizing module 208 will take the form of executable instructions for execution by at least one processor coupled to a memory. The network cross-connect request module instructions, network cross-connect authorizing module instructions, and optimizing module instructions may execute in a single common computer system, or may be distributed across a plurality of interconnected computer systems. Similarly, one skilled in the art will appreciate that the datacenter model 202 will be stored on one or more tangible, non-transitory computer-readable media coupled to the processor(s) so as to be accessible by the optimizing module 208.

As will be explained in greater detail below, the datacenter model 202 comprises a plurality of network port data objects, a cross-connect data object and a connection map which uses instances of the network port data objects and the cross-connect data object to map real-world connections between real-world network endpoint ports. As used herein, the term "datacenter model" refers to a model that is sufficient to model cross-connects within the datacenter, and does not require a complete datacenter information management (DCIM) model, although in some embodiments the datacenter model may include additional data beyond that required to model cross-connects. The data structures and methods described herein provide an improved approach for representing a data center, as compared to prior DCIM models, and an improved approach for using that representation to determine paths through the data center.

The network cross-connect request module 204 receives incoming requests for implementation of a cross-connect from a first real-world network endpoint port to a second real-world network endpoint port. For example, the network cross-connect request module 204 may be accessible to customers of the datacenter via the Internet. Within the requests received by the network cross-connect request module 204, the first real-world network endpoint port and the second real-world network endpoint port are physically located in the datacenter. The network cross-connect request module 204 communicates with the network cross-connect authorization module 206.

The network cross-connect authorization module 206 verifies the incoming requests and, for each request, responsive only to verifying that the request is authorized, passes the request to the optimizing module 208. In some cases, the first real-world network endpoint port and the second real-world network endpoint port are associated with the same person (the term "person", as used herein, refers to a natural person or a corporation or other non-human legal entity). In such circumstances, the verification may be performed by the network cross-connect authorization module 206 confirming that the request came from an authorized agent of the person, for example by use of a password or authorization code, or seeking confirmation from an authorized agent, e.g. by e-mail. However, in most cases, the first real-world network endpoint port is associated with a first legal person and the second real-world network endpoint port is associated with a second legal person who is different from the first person. In these cases, the network cross-connect authorization module 206 verifies that the request is authorized by both the first person and the second person. For example, an e-mail could be sent to the authorized agents of the parties asking them to log in and confirm that the request is authorized. Upon verification of the request by the authorization module 206, the authorization module 206 will pass the verified request to the optimizing module 208.

The optimizing module 208 receives verified requests from the authorization module 206 and uses the datacenter model 202 to determine, for each request, a cross-connect path from the first real-world network endpoint port to the second real-world network endpoint port and traversing zero or more real-world network intermediate ports in the datacenter represented by the datacenter model. The optimizing module 208 uses at least one optimizing criterion to determine the cross-connect path. Optimizing criteria may include, for example, path length (e.g. shortest available path length), network speed requirements, network quality requirements, installation urgency and/or available cable inventory. Once the optimizing module 208 has determined the cross-connect path for a given request, it may associate that path with a communication 210, e.g. an e-mail, to one or more staff members 212 at the datacenter so that the corresponding physical connections can be made. The optimizing module 208 may also manage testing of the physical connections and updating of the datacenter model 202 to reflect the new cross-connect.

As shown by the arrow from the staff members 212 to the network cross-connect request module 204, additional requests may be input to the cross-connect request module 204 and these requests may be processed using the current state of the data center model 202, which will include previously-created cross-connect paths.

Figure 3:
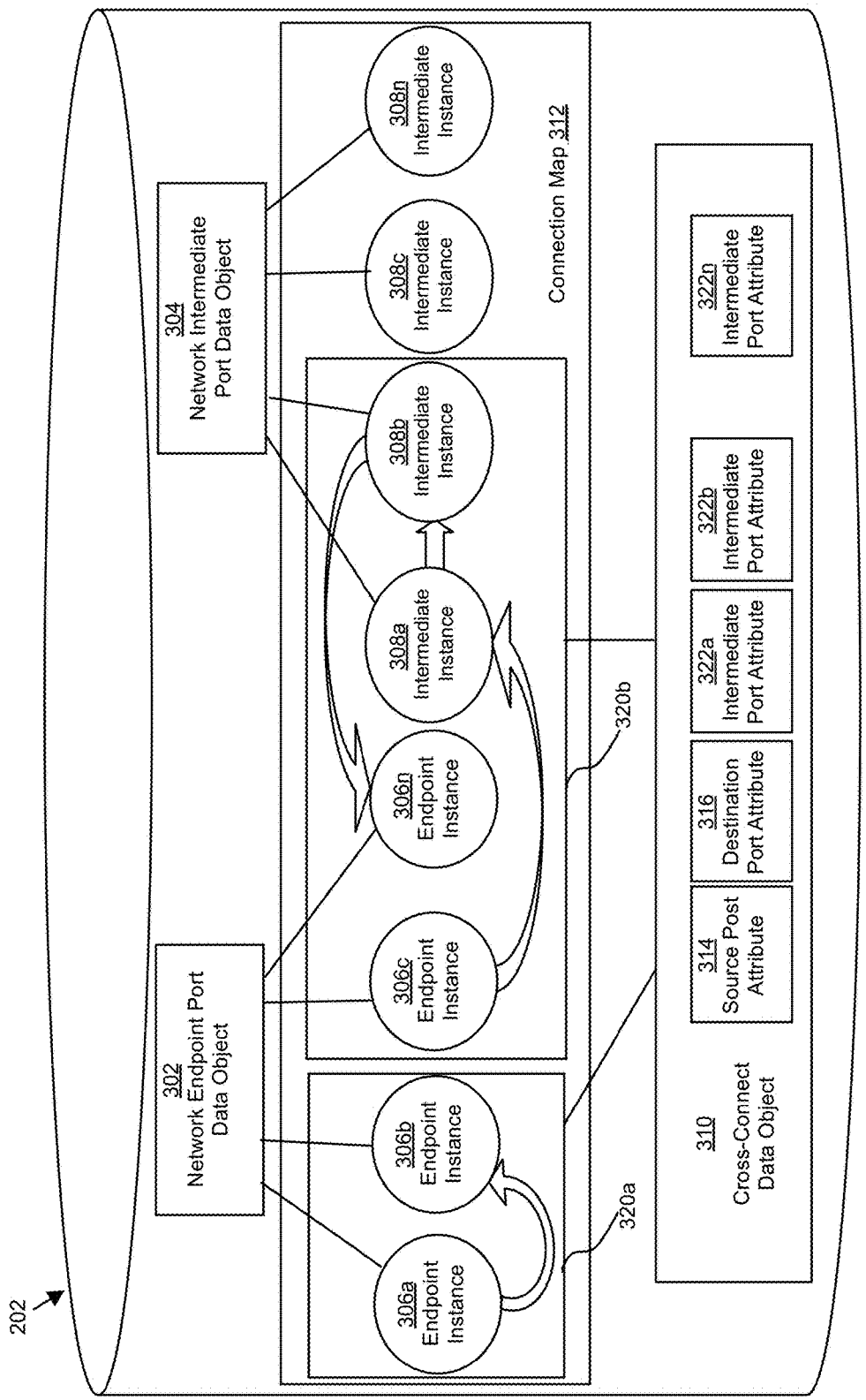
FIG. 3 is a schematic block diagram of an exemplary datacenter model in accordance with embodiments of the present invention.

Reference is now made to FIG. 3 which shows the exemplary datacenter model 202 in more detail, again in schematic form for ease of illustration. As noted above, the datacenter model 202 comprises a plurality of network port data objects and a plurality of network port instances. In the illustrated embodiment, the network port data objects comprise a network endpoint port data object 302 and a network intermediate port data object 304. Thus, the datacenter model 202 further comprises a plurality of network endpoint port instances 306a, 306b, 306c . . . 306n and a plurality of network intermediate port instances 308a, 308b, 308c . . . 308n. Each network endpoint port instance 306a, 306b, 306c . . . 306n is an instance of the network endpoint port data object 302 and corresponds, in one-to-one relationship, to a real-world network endpoint port, such as a router port, server port, or a patch panel port, in the datacenter represented by the datacenter model 202. Similarly, each network intermediate port instance 308a, 308b, 308c . . . 308n is an instance of the network intermediate port object 304 and corresponds, in one-to-one relationship, to a real-world network intermediate port, e.g. a connector port, in the datacenter represented by the datacenter model 202. While the exemplary embodiment uses distinct data objects 302, 304 to represent network endpoint ports and network intermediate ports, respectively, in other embodiments, a single data object may equivalently be used to represent both network endpoint ports and network intermediate ports, with one or more attributes of the single data object being used to distinguish between network endpoint ports and network intermediate ports. Exemplary attributes of illustrative implementations of the network endpoint port data object 302 and network intermediate port data object 304 are described further below.

The datacenter model 202 further comprises a cross-connect data object 310 and a connection map 312. Each cross-connect data object 310 has a source port attribute 314 and a destination port attribute 316. The connection map 312 comprises a plurality of cross-connect instances 320a, 320b, with each cross-connect instance 320a, 320b being an instance of the cross-connect data object 310 and corresponding, in one-to-one relation, to a real-world cross-connect (i.e. physical network connection) between two real-world network endpoint ports that are physically located in the datacenter represented by the datacenter model 202. Thus, within the datacenter model 202, the real-world ports are modeled by instances 306a, 306b, 306c . . . 306n and 308a, 308b, 308c . . . 308n of the network endpoint port data object 302 and network intermediate port data object 304, respectively, and the real-world cross-connects are modeled by instances 320a, 320b of the cross-connect data object 310. The real-world cross-connect may be a single cable coupling the two real-world network endpoint ports (e.g. a patch connection) as shown by instance 320a, in which case the real-world cross-connect does not traverse any real-world network intermediate ports in the datacenter such, or the real-world cross-connect may traverse one or more real-world network intermediate ports in the datacenter as shown by instance 320b. Thus, each real-world cross-connect will traverse zero or more real-world network intermediate ports in the datacenter represented by the datacenter model 202, and may be modeled by an instance 320a, 320b of the cross-connect data object 310. The cross-connect data object 310 may include one or more attributes 322a, 322b . . . 322n for specifying network intermediate ports on the path of the real-world cross-connect, or may cooperate with other data objects in the datacenter model 202 to specify network intermediate ports on the path of the real-world cross-connect.

Thus, within the datacenter model 202, the real-world ports are modeled by instances 306a, 306b, 306c . . . 306n and 308a, 308b, 308c . . . 308n of the network endpoint port data object 302 and network intermediate port data object 304, respectively, and the real-world cross-connects are modeled by instances of the cross-connect data object 310.

As noted above, the term "port" refers to a physical port on a computer system or part thereof, such as a server, a router, a patch panel, or on a connector or cabinet, to which a cable may be connected to enable wired transmission of data. In the illustrated embodiment, these ports are modeled using network port data objects, namely network endpoint port data object 302 and network intermediate port data object 304. The network endpoint port data object 302 and network intermediate port data object 304 each have a unique port identifier attribute (e.g. a port "name") to allow instances thereof to be distinguished, a port position attribute specifying the physical location of the modeled port within the datacenter, and a communication port cable type attribute. The communication port cable type attribute specifies the type of cable that mates with the modeled port.

As noted above, the computer systems hosted in datacenters are often housed in vertically arranged banks supported by a rack and the term "rack" is used to refer to a single vertical bank of computers and related components in a datacenter. A naming convention may be adopted which uses the location of the rack within the datacenter and the position of the port on the rack (i.e. the position of the port on the computer system or component and the position of the component on the rack) to uniquely specify the position of the port. Since the port position is uniquely specified, a single attribute may serve as both the unique port identifier attribute and also as the port position attribute; the "name" of an instance of the network endpoint port data object 302 or an instance of the network intermediate port data object 304 will both uniquely identify the instance and specify the position of the port modeled by that instance. One exemplary naming convention will now be described.

In the exemplary embodiment, a hierarchical naming convention is adopted. The exemplary naming convention is applied in respect of a rack as follows, with a period (".") used as a delimiter:

Datacenter Site
Level/Work Area
Row Position
Column Position
Panel Direction (Front (F) or Rear (R))/Rack Unit
Port Number For example, consider a patch panel port named "DC1.3C.02.03.F45.2". With a period (".") used as a delimiter, the name completely specifies the position of the port as follows:

DC1=the rack is in the "DC1" datacenter
3C=the rack is on level 3 of the datacenter, in work area C
02=the rack is in row 2
03=the rack is in column 3
F45=the port is in the front patch panel in unit 45
2=the port is port number 2

By including the datacenter site in the naming convention, the datacenter model can encompass multiple datacenter sites. In embodiments in which the datacenter model is limited to only a single datacenter site, the portion of the naming convention specifying the datacenter site can be omitted since there is only a single site. Similarly, the portion of the naming convention specifying the level and work area of the rack can be modified in the case of a single-level datacenter, or omitted for a datacenter having only a single work area.

The exemplary hierarchical naming convention may be applied to a connector as well. A connector will typically have several modules at the front panel, with each module having several ports. The ports in a module of a connector are typically arranged in an array so that a row number and column number will uniquely specify a particular port in a module. Alternatively or additionally, a port number can be assigned and included in the naming convention for a connector. The exemplary hierarchical naming convention is applied in respect of a connector as follows:

Datacenter Site
Connector Equipment (uniquely identifies the connector within the datacenter site and therefore also specifies its location since connectors are generally fixed equipment)
Module
Row Position
Column Position
Panel Direction (for most connectors this will always be front (F))

For example, consider a connector port named "DC1.C3.B.01.02.F". With a period (".") used as a delimiter, the name completely specifies the position of the port as follows:
DC1=the connector is in the "DC1" datacenter
C3=the port is on connector 3
B=the port is on module B of the connector
01=the port access point is in row 2
02=the port access point is in column 1
F=the port is in the front panel In embodiments in which the datacenter model is limited to only a single datacenter site, the portion of the naming convention specifying the datacenter site can be omitted since there is only a single site.

As noted above, a "cabinet" is the mass interconnect system located in an Intermediate Connection Room (ICR), also called a "Meet-Me Room" or "InterConnect Room". For the purposes of the datacenter model 202, a cabinet can be treated as a special type of connector, with the exemplary hierarchical naming convention applied as follows:
Datacenter Site
Intermediate Connection Room
Shave—Tray Number
Row Position
Column Position
Panel Direction (for most cabinets this will always be front (F))

For example, consider a connector port named "DC2.IC3.S2.04.02.F". With a period (".") used as a delimiter, the name completely specifies the position of the port as follows:
DC2=the connector is in the "DC2" datacenter
IC3=the port is in interconnect room 3
S2=the port is on shave S and tray 2
01=the port access point is in row 4
02=the port access point is in column 2
F=the port is in the front panel In some exemplary embodiments, the datacenter model may comprise a database, which may be a relational database or a noSQL database. One exemplary relational database design for a datacenter model will now be described in which the data objects are represented using tables and the attributes are fields; the exemplary database model follows the star schema, which separates process data into facts (i.e. quantitative data) and dimensions (descriptive attributes that relate to fact data).

Figure 4:
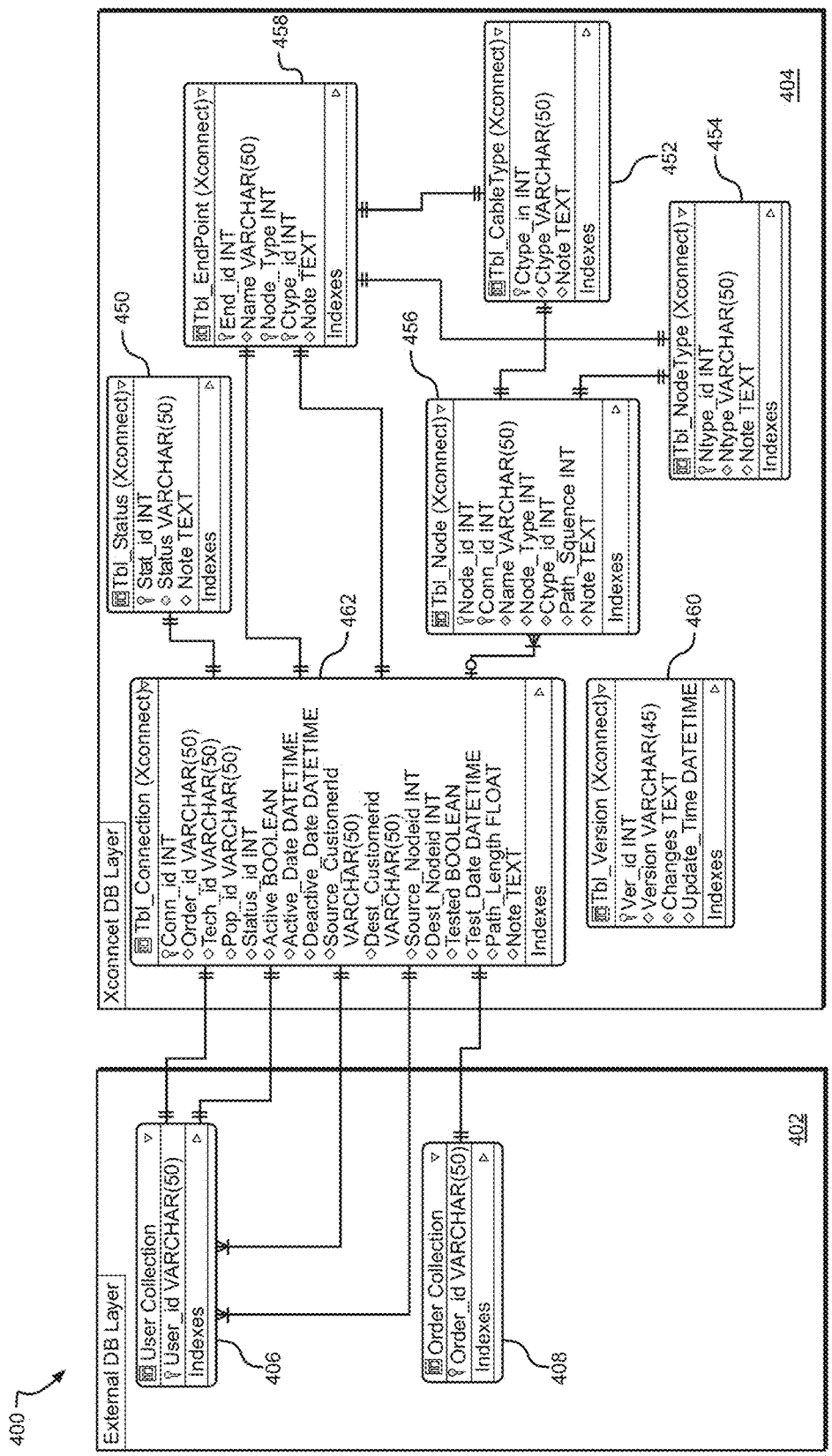
FIG. 4 is a schematic block diagram of an exemplary entity-relationship (ER) model for a relational database datacenter model in accordance with embodiments of the present invention.

Reference is now made to FIG. 4, which shows an exemplary entity-relationship (ER) model 400. The ER model 400 comprises an external database layer 402 and a cross-connect database layer 404 (denoted by the term "Xconnect"); the external database layer 402 will be briefly discussed but the focus will be on the cross-connect database layer 404.

The external database layer 402 comprises a user collection table 406 and an order collection table 408. These tables identify information relating to the cross-connect request; this information is consumed by the cross-connect table 462. The user collection table 406 contains data about users of the datacenter (individuals, companies, ISPs and/or others) and may be used by the network cross-connect authorization module 206 (FIG. 2). The order collection table 408 stores information about requests, such as status, start date, end date, type of service, etc. and may be used by the network cross-connect authorization module 204.

The cross-connect database layer 404 comprises a status table 450 denoted as "tbl_Status (Xconnect)", a cable type table 452 denoted as "tbl_CableType (Xconnect)", a node type table 454 denoted as "tbl_NodeType (Xconnect)", a network intermediate port table 456 denoted as "tbl_Node (Xconnect)", a network endpoint port table 458 denoted as "tbl_EndPoint (Xconnect)", a version table 460 denoted as "tbl_Version (Xconnect)" and a cross-connect table 462 denoted as "tbl_Connection (Xconnect)". The network intermediate port table 456 is one exemplary implementation of a network intermediate port data object 304 as noted above, and similarly the network endpoint port table 458 is one exemplary implementation of a network endpoint port data object 302. Within the data structure of the cross-connect database layer 404, the term "node" is used synonymously with "port".

As will be explained in greater detail below, the cross-connect table 462 represents a connection between two network endpoint ports, and as such the cross-connect table 462 is one example of a cross-connect data object 310 in a relational database implementation of the datacenter model 202. The cross-connect table 462 has a single one-to-one relationship with the status table 450, that is, each connection represented by the cross-connect table 462 has a single status. The cross-connect table 462 has two distinct one-to-one relationships with network endpoint port table 458—one relationship represents the "source" network endpoint port and one relationship represents the "destination" network endpoint port. Note that the terms "source" and "destination" do not imply a limitation of one-way data traffic; data may flow in both directions between the "source" and "destination". The cross-connect table 462 also has a one-to-"zero through many" relationship with the network intermediate port table 456, indicating that a connection between network endpoint ports may traverse one or more network intermediate ports. In the illustrated embodiment, while the cross-connect table 462 represents a connection between two network endpoint ports which may traverse network intermediate ports, the cross-connect table 462 specifies only the network endpoint ports and does not itself specify the specific path between those network endpoint ports.

The network intermediate port table 456 and the network endpoint port table 458 each have a single one-to-one relationship with each of the cable type table 452 and the node type table 454; each port accepts a particular type of cable connection and is part of a particular type of system.

Reference will now be made to FIGS. 5 to 11, where the data structure for the exemplary tables 450 to 462 is shown in greater detail.

Referring first to FIG. 5, the exemplary status table 450 has a "stat_id" attribute 502 which is a unique identifier and serves as a primary key, a "status" attribute 504 which describes the status of the connection, and a "note" attribute 506 for recording additional information. In alternate embodiments, the status table 450 may be omitted and the attributes included in the cross-connect table.

Reference is now made to FIG. 6. The exemplary cable type table 452 has a "cType_id" attribute 602 which is a unique identifier and serves as a primary key, a "cType" attribute 604 which describes the cable type (e.g. "Fiber—

Single Mode" as shown in FIG. 6), and a "note" attribute 606 for recording additional information.

Now referring to FIG. 7, the exemplary node type table 454 has an "nType_id" attribute 702 which is a unique identifier and serves as a primary key, an "nType" attribute 504 which describes the node, i.e. the type of equipment of which the node (port) forms a part, and a "note" attribute 706 for recording additional information.

In alternate embodiments, the cable type table 452 and/or the node type table 454 may be omitted and the relevant attributes may instead be included directly in the network intermediate port table and the network endpoint port table.

With reference now to FIG. 8, the data structure of the exemplary network intermediate port table 456 is shown in greater detail. The network intermediate port table 456 is one example of a network intermediate port data object 304 in a relational database implementation of the datacenter model 202. The exemplary network intermediate port table 456 has a "node_id" attribute 802, which is a unique identifier and serves as a primary key, as well as a "conn_id" attribute 804, which serves as a foreign key. As noted above, the cross-connect table 462 also has a one-to-"one through many" relationship with the network intermediate port table 456, and the "conn_id" attribute associates a particular network intermediate port instance with a cross-connect instance. The exemplary network intermediate port table 456 also has a "name" attribute 806; in the illustrated embodiment the "name" attribute 806 follows the hierarchical naming convention noted above and will therefore also uniquely specify the position of the port. The exemplary network intermediate port table 456 further comprises a "node_type" attribute 808, which references the exemplary node_type table 454 to identify the type of equipment of which the node (port) forms a part, and a "cType_id" attribute 810, which references the exemplary cable type table 452 to identify the type of cable used with that node (port). The exemplary network intermediate port table 456 also includes a "path_squence" attribute 812, which is used to indicate the order of the node (port) within the cross-connect, and a "note" attribute 814 for recording additional information.

Referring now to FIG. 9, the data structure of the exemplary network endpoint port table 458, which is one example of a network endpoint port data object 302 in a relational database implementation of the datacenter model 202, is shown in more detail. The exemplary network endpoint port table 458 has an "end_id" attribute 902, which is a unique identifier and serves as a primary key. The exemplary network endpoint port table 458 also has a "name" attribute 904 which, in the illustrated embodiment, follows the hierarchical naming convention noted above so as to also uniquely specify the position of the port. Like the exemplary network intermediate port table 456, the exemplary network endpoint port table 458 includes a "node_type" attribute 906, which references the exemplary node_type table 454 to identify the type of equipment of which the node (port) forms a part, and a "cType_id" attribute 908, which references the exemplary cable type table 452 to identify the type of cable used with that node (port). The exemplary network endpoint port table 458 also includes a "note" attribute 910 for recording additional information.

FIG. 10 shows the data structure for the exemplary version table 460, which is used to indicate the current version of the cross-connect database layer 404 (FIG. 4) and track changes relative to the previous version. The exemplary version table 460 includes a "ver_id" attribute 1002, which is a unique identifier and serves as a primary key, a "version" attribute 1004 to record the name of the current release, a "change" attribute 1006 to record changes from the previous version, and an "update_time" 1008 attribute to record the date that the current release was propagated.

Reference is now made to FIG. 11, which shows the data structure for the exemplary cross-connect table 462. As noted above, the cross-connect table 462 is one example of a cross-connect data object 310 in a relational database implementation of the datacenter model 202. The cross-connect table 462 has a "conn_id" attribute 1102, which is a unique identifier and serves as a primary key. As noted above, the "conn_id" value is used by the exemplary network intermediate port table 456 to associate a particular network intermediate port instance with an instance of the cross-connect data object 310. The cross-connect table 462 also has an "order_id" attribute 1104, a "tech_id" attribute 1106 and a "pop_id" attribute 1108. The "order_id" attribute 1104 refers to the order collection table 408 to obtain the order identifier for the order with which the respective instance of the cross-connect data object 310 is associated. The "tech_id" attribute 1106 and the "pop_id" attribute 1108 refer to the user collection table 406 to obtain the technician user identifier and the pop user identifier with which the respective instance of the cross-connect data object 310 is associated. The "tech_id" attribute 1106 records the individual assigned to implement a cross-connect, and the "pop_id" attribute 1108 specifies the datacenter (e.g. according to the exemplary hierarchical naming convention noted above. The "order_id" attribute 1104, "tech_id" attribute 1106 and "pop_id" attribute 1108 all serve as foreign keys.

The cross-connect table 462 further comprises a "status_id" attribute 1110, which also serves as a foreign key and refers to an instance of the exemplary status table 450 to obtain the status of the connection instance, and an "active" attribute, which represents in Boolean format whether the connection instance is currently active. Also included in the cross-connect table 462 are an "active date" attribute 1112 and a "deactive_date" attribute 1114, which show, respectively, the time of activation of the connection instance and the time of deactivation if the connection instance is no longer active.

In addition, the cross-connect table 462 has a "source_customerId" attribute 1116, a "dest_customerId" attribute 1118, a "source_nodeId" attribute 1120 and a "dest_nodeId" attribute 1122, each serving as a foreign key. The "source_nodeId" attribute 1120 and "dest_nodeId" attribute 1122 each refer to the endpoint port table 458 to obtain the identifiers for the source node (port) and destination node (port) respectively. The "source_customerId" attribute 1116 and "dest_customerId" attribute 1118 both refer to the user collection table 406 to obtain the identifiers for the customers associated with the source node (port) and destination node (port), respectively.

The cross-connect table 462 also includes a "tested" attribute 1124 and a "test_date" "attribute" 1126 to record whether the connection has been tested and, if so, the date of the test.

In the illustrated embodiment, the cross-connect table 462 includes a "path_length" attribute 1128 which records the total length of cable involved in the connection. Optionally, the datacenter model 202 may include cable data objects to represent at least some of the real-world cables in the datacenter. The cable data objects would include cable attributes such as cable length and cable type (e.g. by reference to the cable type table 452). Cable data objects may be utilized by including a cable inventory model as part of the datacenter model. The cable inventory model may comprise a plurality of cable instances, with each cable instance being an instance of a cable data object and corresponding to a real-world cable that is physically present in the datacenter, as well as an indication of whether or not each cable instance is already part of an existing path. In such an embodiment, the optimizing module 208 may use availability of the real-world cable that is physically present in the datacenter and not part of an existing path as an optimizing criterion, or may reallocate cables from one path to another. The cable data object may also include a cable diameter attribute, and the datacenter model 202 may also include a conduit data object to represent the conduits in the datacenter, with the conduit data object having a lumen size attribute representing the total space available in the conduit. In such an embodiment, the optimizing module 208 may use available conduit space (i.e. remaining space within the conduit given the cables already supported therein) as an optimizing criterion.

Additionally, the cross-connect table 462 includes a "note" attribute 1130 to record additional information.

As noted above, the cross-connect data object 310 may include one or more attributes for specifying network intermediate ports on the path of the real-world cross-connect, or may cooperate with other data objects in the datacenter model 202 to specify network intermediate ports on the path of the real-world cross-connect. In the exemplary relational database model described above, the cross-connect data object 310 does not directly include attributes for specifying network intermediate ports on the cross-connect path; this information is specified by way of the "conn_id" foreign key 804 in the network intermediate port table 456, which corresponds to the "conn_id" attribute 1102 in, and serves as the primary key for, the cross-connect table 462. This correspondence links instances 308a, 308b, 308c . . . 308n of the network intermediate port data object 304 associated with a particular real-world cross-connect to the instance 320b of the cross-connect data object 310 that models that particular cross-connect. In other embodiments, the cross-connect table 462 may include one or more attributes (fields) to associate instances 308a, 308b, 308c . . . 308n of the network intermediate port data object 304 with a particular instance 320a, 320b of the cross-connect data object 310.

The connection map 312 comprises a plurality of cross-connect instances 320a, 320b, with each cross-connect instance 320a, 320b being an instance of the cross-connect data object 310. Thus, where the cross-connect table 462 is used as a cross-connect data object 310, the connection map 312 will comprise the collection of all entries in the cross-connect table 462.

Reference is now made to FIG. 12, which shows an exemplary document-based schema 1200 which may, in an embodiment, be used as a cross-connect data object 310. The schema 1200 is used as part of a noSQL database design.

At line 1202, the "conn_id" attribute is specified as an object string; this will serve as a unique identifier for each instance of the cross-connect data object 310. At line 1204, the "order_id" attribute is specified as a string value, at line 1206, the "tech_id" attribute is specified as a string value and at line 1208, and the "pop_id" attribute is specified as a string value. The "order_id" attribute at line 1204 will identify the request associated with each instance of the cross-connect data object 310, the "tech_id" attribute at line 1206 will identify the technician assigned to that request and the "pop_id" attribute at line 1208 identifies the pop user (i.e. datacenter) associated with each instance of the cross-connect data object 310. The attributes "order_id", "tech_id" and "pop_id" at lines 1204, 1206 and 1208, respectively, are similar in function to the "order_id" attribute 1104, "tech_id" attribute 1106 and "pop_id" attribute 1108 described above in the context of the cross-connect table 462, and lines 1204, 1206, 1208 also specify a reference key for each attribute.

Line 1210 specifies the "status" attribute as an array (i.e. a list of options for selection by a user); this provides similar information to that provided by the status table 450 in the relational database model. Line 1212 specifies the "isActive" attribute as a Boolean value to indicate whether the real-world cross-connect represented by the instance of the cross-connect data object 310 is active, and the attributes "active time" and "inactive time" specified as date/time values at lines 1214 and 1216, respectively, indicate when the real-world cross-connect represented by the instance of the cross-connect data object 310 was activated and deactivated.

At lines 1218 and 1220, the attributes "source_customerId" and "dest_customerId", respectively, are specified as string values; these will identify the respective owners of the "source" network endpoint port and the "destination" network endpoint port for the real-world cross-connect represented by an instance of the cross-connect data object 310. The "source_customerId" and "dest_customerId" attributes at lines 1218 and 1220 are similar in function to the "source_customerId" attribute 1116 and "dest_customerId" attribute 1118 in the cross-connect table 462, and lines 1218 and 1220 also specify a reference key for each attribute.

The exemplary schema 1200 incorporates the network endpoint port data objects 302 and the network intermediate port data objects 304 as embedded documents. Thus, at line 1222 the attribute "source_node" is specified as an embedded document described at lines 1224 to 1230, and similarly at line 1232 the attribute "dest_node" is specified as an embedded document described at lines 1234 to 1240; each embedded document is a network endpoint port data object 302. Likewise, the attribute "path" is specified at line 1242 as an array of embedded documents, with each element in the array being a network intermediate port data object 304.

The embedded documents which serve as the network endpoint port data objects 302 have the same structure, and have attributes that describe similar information to that specified by the exemplary network endpoint port table 458 in the relational database model. Thus, the network endpoint port data objects 302 embedded as documents at lines 1222, 1232 each include a "name" attribute specified as a string value (lines 1224, 1234), a "type" attribute specified as an array (lines 1226, 1236), a "cableType" attribute specified as an array (lines 1228, 1238), and a "note" attribute specified as a string value (lines 1230, 1240). The "name" attribute (lines 1224, 1234) is similar to the "name" attribute 904 in the network endpoint port table 458, and follows the hierarchical naming convention noted above so as to also uniquely specify the position of the port. The "type" attribute (lines 1226, 1236) is similar to the "node_type" attribute 906 in the network endpoint port table 458, and contains information similar to that specified in the exemplary node type table 454 to identify the type of equipment of which the node (port) forms a part. The "cableType" attribute (lines 1228, 1238) is similar to the "cType_id" attribute 908 in the network endpoint port table 458, and contains information similar to that specified in the exemplary cable type table 452 to identify the type of cable used with that node (port). The "note" attribute (lines 1230, 1240) is similar to the "note" attribute 910 in the network endpoint port table 458 and is used for recording additional information.

The structure of the embedded documents that serve as the network intermediate port data objects 304 is similar to that of the embedded documents which serve as the network endpoint port data objects 302. Thus, the network intermediate port data objects 302 embedded as documents at lines 1242, 1252 each include a "name" attribute specified as a string value (lines 1246, 1256), a "type" attribute specified as an array (lines 1248, 1258), a "cableType" attribute specified as an array (lines 1250, 1260), and a "note" attribute specified as a string value (lines 1252, 1262). While only two embedded documents are shown for simplicity of illustration, any arbitrary number of embedded documents may be included in the "path" attribute (array) specified at line 1242. The embedded documents that serve as the network intermediate port data objects 304 also function as attributes 322a, 322b . . . 322n in the cross connect data object 310 for specifying network intermediate ports on the path of the real-world cross-connect.

The structure of the embedded documents that serve as the network intermediate port data objects 304 differs from that of the embedded documents which serve as the network endpoint port data objects 302 in that the embedded documents that serve as the network intermediate port data objects 304 are provided, at lines 1244 and 1254 with an additional attribute "sequence". The "sequence" attribute is specified as a number value and specifies the sequence of the network intermediate ports modeled by the network intermediate port data objects 304 in the real-world cross-connects modeled by the cross-connect data object 310. The "sequence" attribute (lines 1244 and 1254) is similar to the "path_squence" attribute 812 in the exemplary network intermediate port table 456. Alternatively, the sequence may be specified by the order in which the documents are embedded.

At line 1264, a "path_length" attribute is specified as a number value; this attribute is similar to the "path_length" attribute 1128 in the cross-connect table 462 and records the total length of cable involved in the real-world cross-connect modeled by an instance of the cross-connect data object 310. Line 1266 specifies a "note" attribute as a string value for recording additional information.

As noted above, the connection map 312 comprises a plurality of cross-connect instances 320a, 320b, with each cross-connect instance 320a, 320b being an instance of the cross-connect data object 310. Thus, in an embodiment in which the document-based schema 1200 is used as a cross-connect data object 310, the connection map 312 will comprise the collection of all instances of cross-connect documents according to the schema 1200.

The relational database model and the noSQL database model described above are merely representative examples of possible implementations of the datacenter model 202 described above, and are not intended to be limiting. Many variations will be apparent to one skilled in the art, now informed by the present disclosure. The datacenter model 202 can be used by the optimizing module 208 to plan a path for new real-world cross-connects when requests therefor are received, and to record the new real-world cross-connects once implemented.

Figure 13:
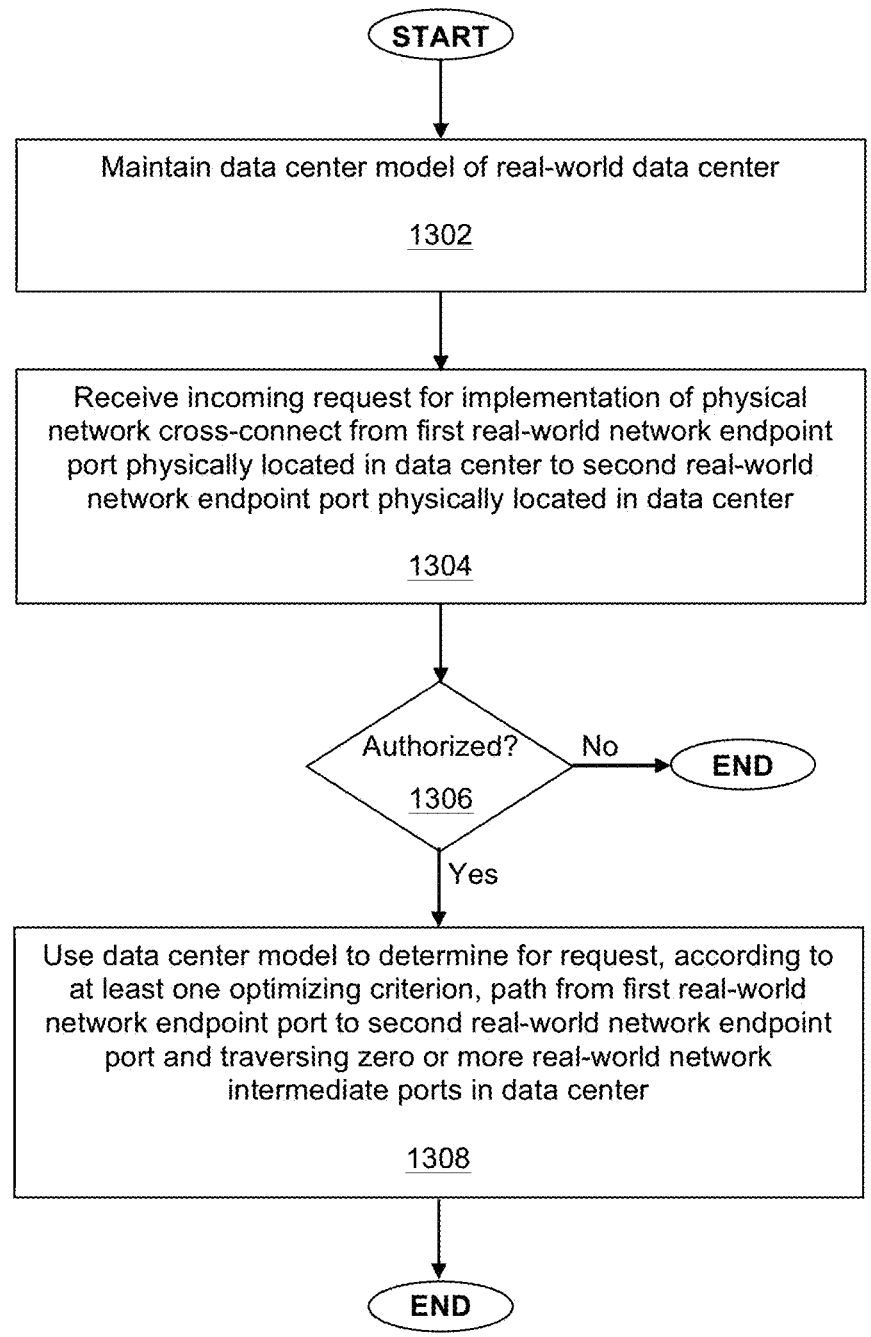
FIG. 13 is a process flow diagram of a method for managing physical network cross-connects in a datacenter in accordance with embodiments of the present invention.

FIG. 13 is a flow chart showing an exemplary method 1300 for managing physical network cross-connects in a datacenter. At step 1302, a datacenter model of a real-world datacenter is stored on at least one tangible computer-readable medium storing. The datacenter model may be, for example, of the type described above. At step 1304, the method 1300 receives an incoming request for implementation of a physical network cross-connect from a first real-world network endpoint port that is physically located in the datacenter to a second real-world network endpoint port that is physically located in the datacenter. At step 1306, the method 1300 verifies the incoming requests and, responsive only to verifying that the request is authorized, proceeds to step 1308. If the request is determined at step 1306 not to be authorized, the method 1300 ends. At step 1308, the method 1300 uses the datacenter model to determine for the request, according to at least one optimizing criterion, a path from the first real-world network endpoint port to the second real-world network endpoint port and traversing zero or more real-world network intermediate ports in the datacenter represented by the datacenter model. After completing step 1308, the method 1300 ends.

Figure 14:
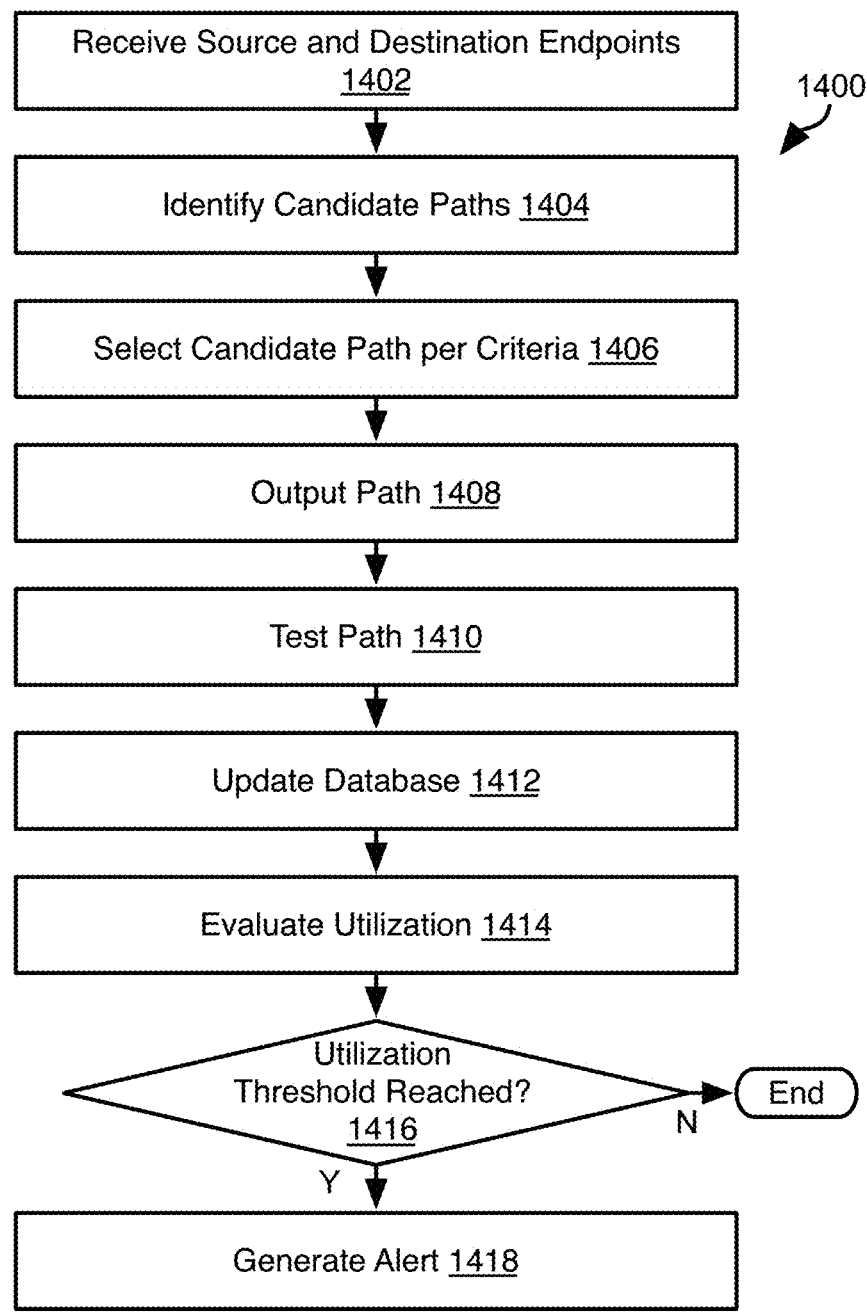
FIG. 14 is a process flow diagram of a method for using a datacenter model to manage a datacenter in accordance with an embodiment of the present invention.

Referring to FIG. 14, the illustrated method 1400 may be executed by a computer system 100 with respect to a data center model 202. For example, the illustrated method 1400 may be executed as part of step 1308 of the method of FIG. 13.

The method 1400 may include receiving 1402 the specified source and destination end points. The method 1400 may include identifying 1404 candidate paths according to the cross-connect instances 320a, 320b and port instances 306a-306n, 308a-308n of the data center model 202. As noted above, each port instance may be labeled with a location of that port, i.e. a location in the data center and/or a location on a particular component. Accordingly, for a given location of the source and destination endpoints, a candidate path represents a series of ports that are connected to one another by a current cross-connect instance 320a, 320b or which can be connected to one another due to co-location on the same component (e.g., server, router, patch panel, cabinet, etc.) or co-location in the same room of the data center. The series of ports in a candidate path further include ports on the same component or in the same room as the source and destination endpoints.

Identifying candidate paths 1408 may be performed by starting at one of the source or destination endpoints and identifying paths that include a port of that endpoint, i.e. a series of ports that are coupled by actual cross-connects or are available to be cross-connected due to location on the same component or in the same room of the data center. Those paths that include a port of the other endpoint (source or destination) are candidate paths.

As noted above, ports may have cable types associated therewith. Accordingly, candidate paths may only include cross-connects between ports that have identical or compatible cable types.

As noted above, ports may be labeled using a naming convention that lists some or all of
 Datacenter Site
 Level
 Work Area
 Row Position
 Column Position
 Panel Direction (Front (F) or Rear (R))/Rack Unit
 Port Number This naming convention combines a matrix coordinate (e.g., row column, front, back) along with a indexing system (data center, level, area). This naming convention speeds up locating, recognizing, searching, and visualization of instances of port objects. For example, when determining whether ports are available to be interconnected to complete a path, one or more port objects that have a comment data center, level, area, and panel direction to a port referenced in a cross-connect instance in a candidate path may be quickly identified. If one or more exists, then one or more candidate paths passing including the one or more port objects may be added to the candidate paths. Inasmuch, the labeling schema enables rapid traversal of a tree through the data center, level, and side (front/rear) area to locate a panel of port that is a potential addition to a candidate path.

Figure 15:
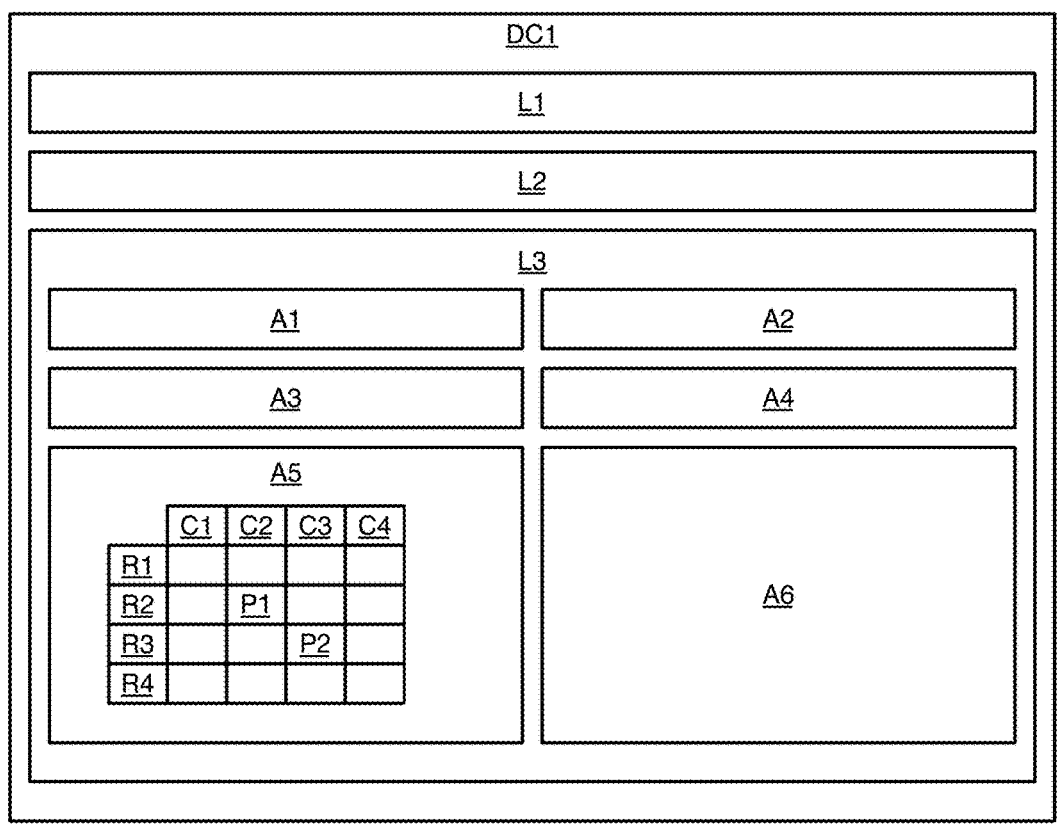
FIG. 15 is a diagram illustrating a hierarchical arrangement of a datacenter.

For example, referring to FIG. 15, port P1 may be referenced by a cross-connect instance and port P2 may be referenced by another cross-connect instance. If port P1 is referenced by a cross-connect instance that is in a candidate path emanating from one of the source and destination port, then port P2 may be identified as a potential extension of that candidate path along with zero or more other ports. In order to identify port P2, those ports having the same data center, level, and area, labels as port P1 may be identified from the hierarchical representation of the data center. In particular, the label of the port object instance representing P1 may be of the form DC1.L3.A5.R2.C2 and the label of port the port object instance representing P2 may be DC1.L3.A5.R3.C3. Inasmuch as the portion "DC1.L3.A5" is identical, port P2 is readily identified as a potential connection to port P1.

The labeling convention described herein provides an adaptive hierarchical structure inasmuch as the infrastructure of each data center is unique. This hierarchical structure is not only a realistic view to addressing the clustering problem of cross-connect object instances but also can be adapted to meet the individual data center condition. For example, as a layout changes, backbone data paths are added, or the environment changes, labels for added components may be added to the hierarchy according to their location. Likewise, if a component is moved, the label of its corresponding port object instances and cross-connect object instances may be changed to reflect the new location of its ports.

A selected path may then be selected 1406 according to one or more criteria. For example, a candidate path may be selected according to the method 1600 of FIG. 16. Selecting of a path may be performed using any approach to optimizing a network path, such as based on path length alone or some other criteria. References to "optimizing" and "optimum" do not necessarily require selection of an actual optimum path, but rather an algorithm that selects a path that satisfies conditions of the algorithm and has better performance attributes as compared to one or more non-selected paths.

Note that in some embodiments, the steps of identifying candidate paths 1404 and selecting 1406 a path may be performed simultaneously, such as by searching potential paths and ending the search as soon as a path satisfying some performance criteria (path length, speed, quality, capacity, or combination of these) is found.

The path selected at step 1406 may be output 1408. Outputting 1408 the path may include generating a human-readable representation of the path. Step 1408 may include displaying a textual or schematic representation of the path in an interface or including the representation in an email or other type of message. The representation at step 1408 may visually distinguish between existing cross-connects and places where an operator will need to create cross-connects in order to complete the path. In particular, the locations of components and ports of components that will need to be connected by a cable may be communicated at step 1408.

The method 1400 may include testing 1410 the path. In other embodiments, testing is not performed as part of the method 1400. For example, upon receiving an input that the path has been configured, the computer system 100 may invoke testing of the path by sending of packets between the source and destination endpoints and evaluating whether they are received by the destination or source endpoint. Testing 1410 may include testing some or all of capacity, speed, quality, and path length of the path. Testing 1410 may include performing any network diagnostic test known in the art. In some embodiment testing 1410 may be performed periodically without regard to an input from the user until the path is found to have been completed.

The method 1400 may include updating 1412 the data center model 202 to include cross-connect instances according to the path. For example, a cross-connect instance may be added to the data center model 202 that lists the source and destination endpoints, the ports of the endpoints in the path, and the intermediate ports of the path. This may include a data object in the form of the cross-connect database layer 404 and/or the document-based schema of FIG. 12. In some embodiments, step 1412 is only performed after the path has been tested 1410 and determined to be functional.

The method 1400 may further include evaluating 1414 utilization of one or more components of the datacenter following configuration of the selected path. For example, step 1414 may include evaluating the number of trunk lines in a bundle or ports on a component that remain unconnected as part of a path. Where the number or percentage of utilized lines or ports of a bundle or component exceeds some threshold, e.g. 80%, the utilization threshold may be determined 1416 to be reached and an alert may be generated 1418. Step 1418 may include generating an alert in an interface, sending an email or test message to an operator, generating an audible alert, or any other human perceptible output.

Figure 16:
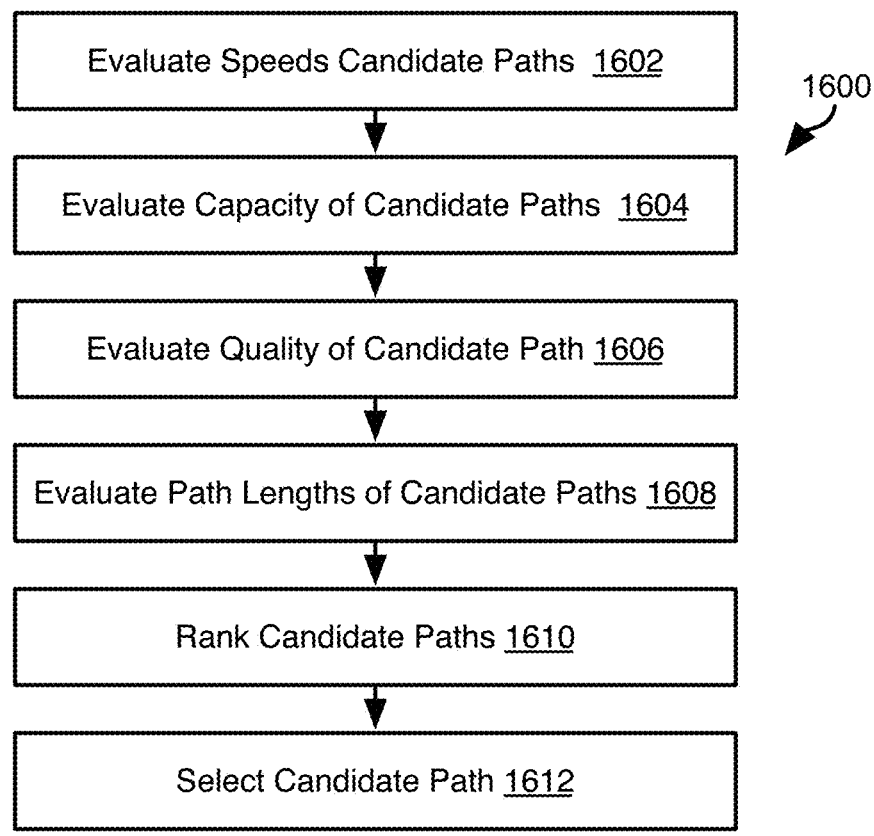
FIG. 16 is a process flow diagram of a method for selecting a path through a datacenter in accordance with an embodiment of the present invention.

FIG. 16 illustrates a method 1600 for selecting a path between source and destination endpoints. The method 1600 may be executed at step 1406 of the method 1400.

The method 1600 may include some or all of evaluating 1602 speeds of the candidate paths, evaluating 1604 capacity of the candidate paths, evaluating 1606 the quality of the candidate paths, and evaluating 1608 the lengths of the candidate paths.

Steps 1602-1608 may be performed based on measured attributes of existing cross-connects included in a candidate path. For cross-connects in a path for which the ports are not currently connected, steps 1602-1608 may include determining a contribution of those cross-connects based on predicted values for speed, capacity, quality, and length. In particular, speed, capacity, and quality may be estimated based on known values for these performance parameters for the cable type associated with the ports of the cross-connect. Length may be inferred from the locations of the ports of the cross connect. In general, cross-connects of a path that do not currently exist will have a small length as compared to trunk lines that may form part of a path. Accordingly, the path length of the non-existent cross-connects of a path may be ignored.

The evaluations of steps 1602-1608 for a candidate path may include aggregating individual measurements or estimates of the performance attributes for cross-connects forming the candidate path.

The method 1600 may include ranking 1610 some or all of the candidate paths according to some or all of the performance attributes evaluated at steps 1602-1608. For example, scores representing the speed, capacity, quality, and path length may be summed, weighted and summed, or combined according to some other function to obtain a final score for the candidate path.

The path with the score indicating best performance will then be selected 1612 as the preferred candidate path that will then be output for implementation and testing.

The datacenter modeling technology described herein represents significantly more than merely using categories to organize, store and transmit information and organizing information through mathematical correlations. The system is in fact an improvement to datacenter technology, as it provides a compact and efficient data structure for representing the physical cross-connects in a datacenter. This enables the datacenter management system to optimize the process of ordering cross-connects, implement a structured workflow for the provisioning of cross-connects, and capture the complete state of cross-connect deployment within a given datacenter. The datacenter modeling technology is also versatile, and can accommodate visualization, fault reporting and management, capacity management, and other advanced services. Moreover, the technology is applied in respect of a particular machine, namely a datacenter management system. As such, the datacenter modeling technology is confined to datacenter management applications.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
providing a database storing data object instances describing locations of a plurality of ports within a datacenter and interconnects between pairs of ports of the plurality of ports, wherein each data object instance of the data object instances corresponding to a port of the plurality of ports has a cable type associated therewith;
receiving, by a computer system, specification of a source endpoint and a destination endpoint;
generating, by the computer system, a path through the datacenter between the source endpoint and the destination endpoint according to the data objects instances;
outputting, by the computer system, a representation of the path, wherein generating the path through the datacenter between the source endpoint and the destination endpoint according to the data object instances comprises generating a path that only has connections between ports having compatible cable types;
wherein the datacenter includes components comprising arrays of ports located on one of a plurality of levels and one of a plurality of areas of the datacenter included among the plurality of ports;
wherein the data object instances include object instances having labels that include a level identifier, area identifier, row identifier, and column identifier of each port of the array of ports within the datacenter; and
wherein generating the path through the datacenter between the source endpoint and the destination endpoint according to the data objects instances comprises identifying pairs of ports having labels with identical level identifiers and row identifiers.

2. The method of claim 1, wherein generating, by the computer system, the path through the datacenter between the source endpoint and the destination endpoint comprises selecting the path according to an optimization algorithm.

3. The method of claim 2, wherein the optimization algorithm selects the path through the datacenter according to one or more criteria including at least one of path length, capacity, speed, and quality.

4. The method of claim 1, further comprising testing the path through the datacenter.

5. The method of claim 1, further comprising adding data object instances for one or more new interconnects of the path through the datacenter to the database.

6. The method of claim 1, wherein providing the database storing data object instances describing locations of the plurality of ports within the datacenter and interconnects between pairs of ports of the plurality of ports comprises providing a relational database m which the data object instances are represented as tables of attributes.

7. The method of claim 1, wherein the database further stores endpoint object instances each representing an endpoint of a plurality of endpoints including the source endpoint and the destination endpoint.

8. The method of claim 1, wherein the source endpoint is associated with a first legal entity and the destination endpoint is associated with a second legal entity, the method comprising: generating the path through the datacenter between the source endpoint and the destination endpoint only in response to authenticating with respect to the first legal entity and the second legal entity.

9. The method of claim 1, wherein at least a portion of the data object instances describing interconnects between pairs of ports of the plurality of ports represent trunk lines passing between rooms and building levels of the datacenter.

10. The method of claim 1, wherein generating the path through the datacentre comprises generating a representation of the path as a sequence of port identifiers corresponding to ports from the plurality of ports.

11. A system comprising:
a datacenter comprising a plurality of endpoints, a plurality of ports, and a plurality of interconnections between ports;
a database stored in a non-transitory storage medium, the database storing data object instances describing locations of the plurality of ports within the datacenter and the plurality of interconnections between pairs of ports of the plurality of ports, wherein each data object instance of the data object instances corresponding to a port of the plurality of ports has a cable type associated therewith;
a computer system comprising one or more processing devices and one or more memory devices operably coupled to the one or more processing devices, the one or more memory devices storing executable code effective to cause the one or more processing devices to:
receive specification of a source endpoint and a destination endpoint from the plurality of endpoints;
generate a path through the datacenter between the source endpoint and the destination endpoint according to the data object instances;
output a representation of the path, wherein the executable code is further effective to cause the one or more processing devices to generate the path through the datacenter between the source endpoint and the destination endpoint according to the data object instances by generating a path that only has connections between ports having compatible cable types;
wherein the datacenter includes components comprising arrays of ports included among the plurality of ports; and
wherein the data object instances include object instances describing locations om a column, row, room, and building level for ports of the array of ports.

12. The system of claim 11, wherein the executable code is further effective to cause the one or more processing devices to generate the path through the datacentre between the source endpoint and the destination endpoint by selecting the path according to an optimization algorithm.

13. The system of claim 12, wherein the optimization algorithm selects the path through the datacenter according to one or more criteria including at least one of path length, capacity, speed, and quality.

14. The system of claim 11, wherein the executable code is further effective to cause the one or more processing devices to add data object instances for one or more new interconnects of the path through the datacenter to the database.

15. The system of claim 11, wherein database comprises a relational database in which data object instances are represented as tables of attributes.

16. The system of claim 11, wherein the datacenter further comprises a plurality of trunk lines passing between rooms and building levels of the datacenter; and
- wherein at least a portion of the data object instances describe interconnects between pairs of ports of the plurality of ports by a trunk line of the plurality of trunk lines.

* * * * *

UNITED STATES PATENT AND TRADEMARK OFFICE
CERTIFICATE OF CORRECTION

PATENT NO. : 10,454,808 B2
APPLICATION NO. : 15/473249
DATED : October 22, 2019
INVENTOR(S) : Lim et al.

Page 1 of 1

It is certified that error appears in the above-identified patent and that said Letters Patent is hereby corrected as shown below:

On the Title Page

The Assignee is listed as: Hong Kong Telecommunications (HTK) Limited, however the correct spelling is Hong Kong Telecommunications (HKT) Limited.

Signed and Sealed this
Third Day of December, 2019

Andrei Iancu
*Director of the United States Patent and Trademark Office*